Aug. 12, 1958     S. R. BURDICK     2,847,258
SAFETY VALVE FOR FLUID CONTROL SYSTEM
Filed March 24, 1950
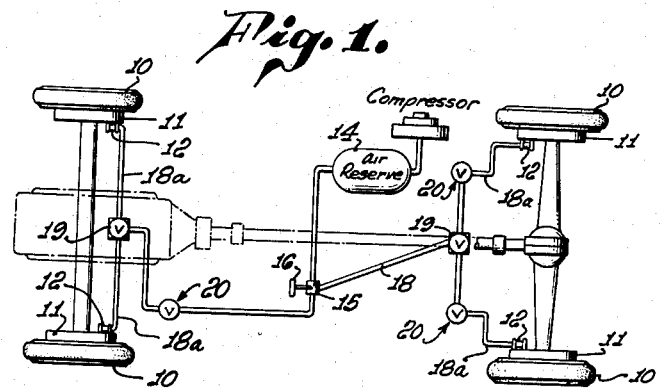
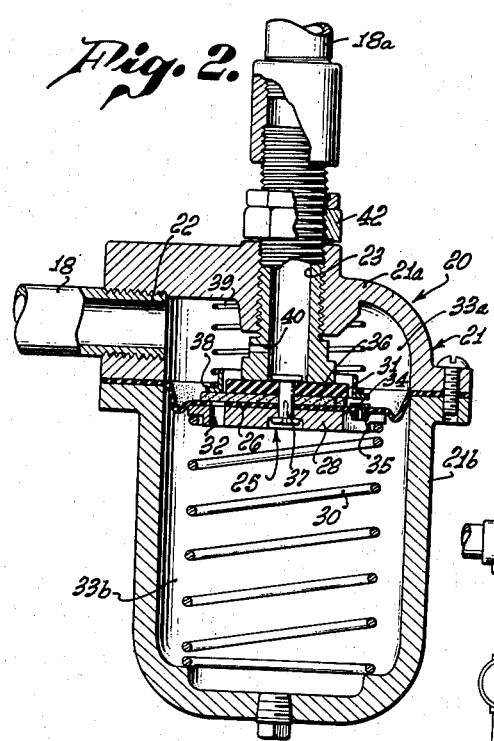
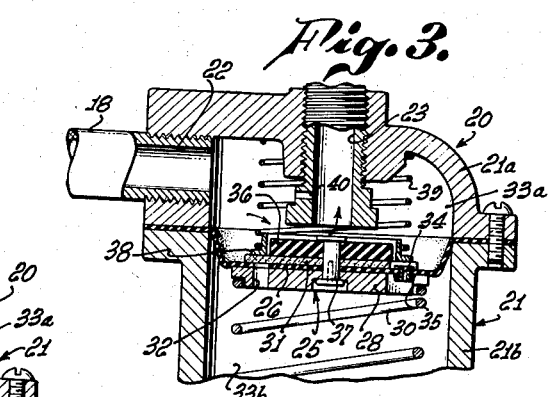
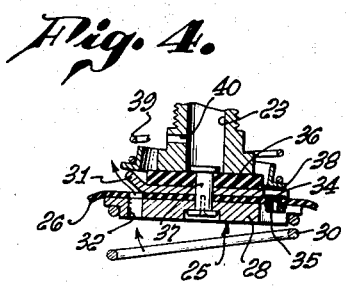
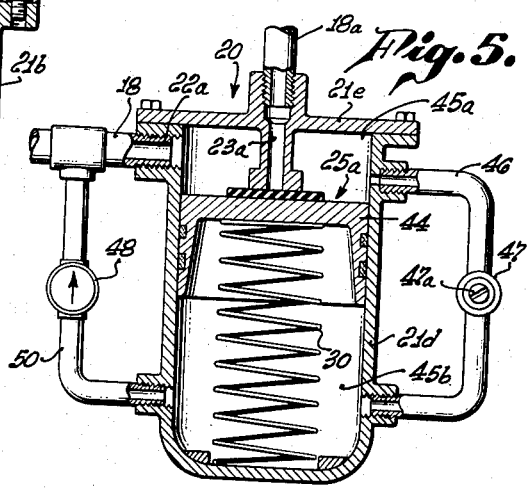
INVENTOR.
SHERMAN R. BURDICK,
BY
Knight & Rodgers
ATTORNEYS.

United States Patent Office 2,847,258
Patented Aug. 12, 1958

2,847,258
SAFETY VALVE FOR FLUID CONTROL SYSTEM

Sherman R. Burdick, Gardena, Calif., assignor to Burdick Bros., Inc., Gardena, Calif., a corporation of California Application March 24, 1950, Serial No. 151,790

5 Claims. (Cl. 303—84)

The present invention relates generally to fluid systems for controlling or operating fluid actuated devices, and more especially to a system including means for preventing loss of operating fluid or operating pressure as a result of a mechanical failure in the system. Such means may take the form of a safety valve structure which is adapted to render a fluid system able to operate at least a portion of a plurality of fluid actuated devices even though another portion of the system is incapable of operating such devices because of a loss of fluid or operating pressure from that latter portion of the system.

A typical example of the type of fluid system with which we are here concerned is the system for operating air brakes on motor vehicles. On trucks and other commercial vehicles especially, the brakes are frequently operated by compressed air. The brake system is subject to mechanical failures in any one of a number of different ways that result in loss of air pressure. A coupling may leak, a metallic pipe may become broken, a flexible hose may deteriorate and eventually rupture under operating pressures, or a diaphragm within the brake operating device may fail. Under any one of these conditions, the operating fluid is free to leave the system suddenly and without warning so that the driver is unexpectedly driving a vehicle on which the brakes cannot be applied.

The serious nature of a sudden and complete failure of the air system for operating brakes of a motor vehicle is too obvious and well-known to require detailed explanation. Brake failures oftentimes occur while a vehicle is in motion, possibly traveling at relatively high speed, so that it is suddenly rendered incapable of being stopped. If the brakes fail while the vehicle is traveling down a long hill, or traveling on a crowded city street, an accident is almost inevitable. A particularly serious feature is that innocent vehicles and persons may suffer by being hit. Also, a substantial amount of secondary damage may result from fire, as in the case of collision with a truck carrying a cargo of gasoline or other inflammable liquid.

The control systems of concern here are primarily those using an elastic or compressible fluid, such as compressed air, as the operating medium. However, it will be understood that my invention is not necessarily limited to a braking system of a motor vehicle, but the principles thereof may be applied to any type of compressible fluid control system which it is desired to protect against loss of operating pressure or fluid.

Hence, it becomes a general object of my invention to provide a fluid pressure control system having protective means in it to safeguard a major portion of the system against loss of operating pressure in the event of mechanical failure in another portion.

It is also a general object of my invention to provide a safety valve which may be incorporated in a control system operated by a compressible fluid to retain fluid and operating pressure within the remainder of the system even though a portion is without sufficient fluid or pressure to function normally.

It is also an object of my invention to provide a safety valve of the character described that is operated by positive means normally to close off the fluid conduit, yet the valve can be opened either by application of sufficient pressure from the source of operating pressure or by a decrease in the pressure so applied to the valve.

These and other objects of my invention have been attained in an operating system having a source of compressible fluid under pressure and a plurality of pressure operated devices connected to said source by conduit means, by placing in the conduit means a safety valve comprising a movable valve member normally closing the conduit to flow therethrough of fluid. This valve member is movable to an open position in response to operating fluid pressure applied to one side of it, the safety valve also including means for equalizing the fluid pressure on both sides of the movable valve member to permit the valve to close against the pressure which opened it. The pressure equalizing means also operates to permit the valve member to move to an open position in response to a decrease in operating pressure applied to said one side and originally operating to open the valve. Means is placed in the system to relieve rapidly higher fluid pressures on the other side of the valve.

The valve structure for use in the pressure system typically includes a housing provided with fluid inlet and fluid outlet openings. A movable valve member is located in the housing in a position at which it is adapted normally to close the outlet but is movable away from the outlet to place the inlet in free communication with the outlet opening. Resilient means, as for example a compression spring, normally urges the valve member toward the outlet and the closed position, but yields under force applied to the valve member by fluid under pressure entering through the inlet. Pressure equalizing means equalizes fluid pressure on both sides of the valve member within a predetermined interval of time, thus permitting the valve to return to the closed position under the influence of the resilient closing means. To insure immediately repeated operation, there is also provided a check valve, located within, inside of, or outside of the housing, which rapidly relieves the fluid pressure on the movable valve member on the side away from the inlet opening whenever the pressure on that side exceeds the pressure on the inlet side.

How the above objects and advantages of my invention, as well as others not specifically referred to herein, are attained will be better understood by reference to the following description and to the annexed drawings, in which:

Fig. 1 is a diagrammatic plan view of a wheeled vehicle with a brake system constructed according to my invention;

Fig. 2 is a vertical median section through a preferred form of safety valve designed according to my invention with the movable valve member in the normal or closed position;

Fig. 3 is a view similar to Fig. 2 but with the movable valve member in the open position permitting free fluid flow between inlet and outlet openings;

Fig. 4 is an enlarged fragmentary view of the movable valve member showing the check valve open for relieving excess pressure on the side away from the inlet opening; and Fig. 5 is a vertical median section through a modified form of safety valve designed according to my invention.

There is shown in schematic form in Fig. 1 a wheeled vehicle, such as an automobile or truck, having a compressed air braking system. The system here shown is a simple, conventional one except for the improvements I have introduced and illustrates the type of control system involving my invention. On each of the wheels 10 is a brake 11 which is operated by cylinder 12 or other similar brake actuating member which is operated by compressed air. The source of air under pressure may be storage tank 14, or any other similar source, which supplies air under pressure to the entire braking system. The flow of air under pressure in the brake control system is regulated by a master control valve 15 which is here shown as being operated by brake pedal 16 but which may also be a valve operated by a hand lever in the well-known conventional manner. By pressing upon brake pedal 16, valve 15 allows air under pressure to pass through suitable conduit means 18 which may consist of metallic tubing with links of flexible hose or the like where necessary. The conduit means includes branches 18a to individual cylinders 12. When the brakes are released, air is discharged from the system through quick-release valves 19, of conventional design. Conduit means 18 connects pressure source 14 to the individual brake operating cylinders 12 in a conventional manner and with the use of conventional parts, except that there is incorporated in the conduit means 18 at suitable points various safety valves as indicated at 20. With the location of valves 20 shown in Fig. 1, a single valve is located in the conduit leading to both front wheel brakes while two valves 20 are in the conduit leading to the rear wheel brakes, one valve for each branch 18a for each rear wheel. It will be understood that various other arrangements of safety valves 20 may be used.

As will be seen from later description, the operation of a valve 20 is normally to close the conduit at that point to fluid flow and open it only for a short time under controlled conditions. In the event of failure of any kind at a point beyond the safety valve, operating pressure is thus not completely lost throughout the system as a result of this failure. For example, in the event of a rupture in the line or in the diaphragm of the brake cylinder 12 of a rear wheel, the associated valve 20 operates to isolate or cut off from the rest of the system the defective portion of the system, and all other brake cylinders 12 continue to operate in a normal manner. Valves 20 may be placed at any desirable points throughout the fluid pressure system, being in general, located between reservoir 14 or other source of fluid pressure and points in the system which experience has indicated are most subject to failure. A safety valve 20 may be placed at either side of a quick-release valve 19 with respect to brake cylinder 12. As indicated in Fig. 1, a single valve 20 may operate to cut off fluid from a single pressure actuated device 12, as in the case of the rear wheels of the truck, or it may cut off and render inoperative a plurality of pressure operated devices, as in the case of the brake cylinders 12 on the two front wheels.

A single valve 20 is placed in the conduit means leading to the two front wheel brakes so that if there is a mechanical failure at either wheel, operating pressure is taken off both wheels in order to assist in steering the vehicle by eliminating any drag upon one front wheel that might be caused by the application of braking action on one wheel only.

Fig. 2 illustrates a preferred form of safety valve 20 which may be incorporated in the air brake system. Valve 20 comprises a body or housing 21 which is preferably made in two parts 21a and 21b for reasons which will become apparent. The upper portion 21a of the housing is provided with a fluid inlet at 22 and a fluid outlet provided by tube 23. Fluid inlet 22 is provided by an opening in the housing wall which is threaded or otherwise formed in a suitable manner for connection to conduit 18 by any type of conventional air line fitting. The fluid outlet from the housing is preferably provided by tube 23 which is threaded into the housing wall, for purposes which will be explained. The inner end of tube 23 provides an orifice which can be closed by a movable valve member in order to prevent fluid flow through conduit 18. The outer end of tube 23 is connected in any conventional manner to a branch line of conduit 18a. Since valve 20 forms a portion of the means confining the pressure fluid as it flows from the source to the pressure operated device, to this extent, the value forms, in effect, a portion of conduit 18.

The movable valve member which normally closes fluid outlet 23 is indicated generally at 25. It comprises a flexible diaphragm 26 which is constrained about its periphery by being clamped between two meeting flanged portions of housing sections 21a and 21b. The central portion of the diaphragm carries a relatively rigid plate portion of the diaphragm carries a relatively rigid plate 28 on its under side which serves as a pad or bearing against which compression spring 30 bears. Spring 30 presses at its other end against the inside face of housing section 21b and exerts a sufficient upward force to keep valve member 25 normally in air tight engagement with the orifice of outlet tube 23.

On its upper face, diaphragm 26 carries a flexible disc 31 which covers vent opening 32 that passes through diaphragm 26 and plate 28 (see Fig. 4). Flexible disc 31 acts as a check valve to limit fluid flow through opening 32 to flow in a direction into the upper portion of housing 21. A second fluid passage 34 is also provided through movable valve member 25. Although the passage may be provided in other positions or by other means, I have here shown the passage as being formed by a hole drilled in rivet 35 which passes through the diaphragm. The rivet provides a metallic member in which a hole of constant size can be placed. Flexible disc 31 and plate 28 are notched or cut away at the side adjacent passage 34 in order that the fluid passage may always be open to permit free flow of fluid through the passage in either direction.

Above disc 31 is a pad or cushion 36 of rubber or other resilient material which is particularly suited to effecting a fluid tight seal when in contact with the end of outlet tube 23. Alternatively, members 31 and 36 can be made as a unit. The members 28, 31 and 36 are fastened in place to diaphragm 26 by a centrally located rivet 37 or any other suitable type of fastening means. Surrounding pad 36 is presser ring 38 which bears against the flexible disc 31 in order to insure that the disc is always in place to seal vent 32 against air flow into the lower chamber. Compression pring 39 bears against housing section 21a and the upper face of ring 38 for this purpose, but yields to allow disc 31 to raise and open vent 32, as shown in Fig. 4.

It will be seen that valve member 25 subdivides the interior of housing 21 into a first or upper chamber 33a and a second or lower chamber 33b, the two chambers corresponding approximately to the space within housing section 21a and housing section 21b respectively. Inlet 22 and outlet 23 both open into the upper chamber. The lower chamber within housing section 21b is entirely sealed off except for its communication with the upper chamber through passages 32 and 34. Assuming a condition in which the pressure in the two chambers is equal, or substantially so, the position of valve member 25 is determined entirely by the force applied to it by spring 30. Spring 30 is strong enough that it normally keeps valve member 25 at the extreme upper range of its movement with pad 36 pressed against the orifice of outlet tube 23, sealing the outlet against fluid flow therethrough. This is the position of the parts illustrated in Fig. 2 and is herein termed the closed position or the normal position of the valve member since it is the position occupied when the brakes are released and there is no operating pressure in conduit 18.

If control valve 15 is now operated in order to apply the brakes, air under pressure is admitted to conduit 18 and pressure within upper chamber 33a is increased because this upper chamber is always in free communication with the pressure source through the open inlet 22. The increased fluid pressure on valve member 25 is sufficient to overcome the force of spring 30 so that the spring yields and is compressed as valve member 25 is moved away from outlet tube 23 to a position similar to that shown in Fig. 3. In this position, the outlet from valve 20 is open and fluid under pressure can flow freely through outlet 23 and conduit means 18 to reach brake cylinder 12.

However, safety valve 20 is designed so that this open position of valve member 25 is maintained only for a predetermined maximum length of time, for example, one second or a fraction thereof. This mode of operation of the valve results from equalization of pressures on the two sides of diaphragm 26 since air under pressure flows at a restricted or controlled rate from the upper chamber through passage 34 into the lower chamber. As a consequence, after an interval of time which can be predetermined and which varies according to several factors, the pressure in the two chambers 33a and 33b becomes equal, or sufficiently nearly so that valve member 25 is again moved under the force of spring 30 into engagement with outlet tube 23 and the outlet is closed, preventing further flow of fluid through conduit 18. The length of time required to obtain equalization of pressures depends upon the relative values of the cross sectional area of passage 34, the volume of the lower chamber within housing section 21b, the force applied by spring 30, and the operating air pressure applied to the upper valve chamber. In practice, it is desirable that passage 34 not be too small, otherwise it is in danger of becoming clogged by dirt or other foreign matter that may be in the air line; and for this reason it is preferred that the typical passage have a diameter of about .04 inch but a greater or a smaller diameter may be used if desired. Having established a diameter for this opening, the volume of the lower chamber can be calculated to close the valve in a desired length of time for the pressures used in the system.

In order to permit some adjustment in this period of time that the valve remains open, outlet tube 23 is adjustably mounted in the wall of housing 21. Since the outlet tube is threaded in the wall, by rotating the tube its inner end can be moved toward or away from valve member 25 so that the position in the travel of valve 25 at which outlet 23 is closed is adjustable. Generally speaking, advancing the end of tube 23 toward the movable valve member increases the force applied by spring 30 so that the length of time the valve remains open is decreased, while movement of tube 23 upwardly in the housing and away from valve member 25 has the opposite effect of increasing the length of time that the valve remains open. The tube can be held in any adjusted position by tightening lock nut 42 on the tube. It will be realized that this adjustable mounting of the outlet from the valve is optional, and also that other means of securing adjustment in the length of time which the valve remains open may be used.

From the foregoing description it will be seen that the lower chamber 33b of valve 20 constitutes a space or chamber at the side of valve member 25 away from inlet 22 in which pressure accumulates. Thus this chamber cooperates with fluid passage 34 to provide pressure equalizing means which control the rate of equalization of fluid pressure on the opposite sides of valve member 25 in order to permit the valve to be closed by spring 30.

In ordinary operation, operating pressure in conduit 18 is usually built up by steps since valve 15 is opened and closed several times in applying the brakes, each time that it is opened the pressure in the operating lines increasing until finally the maximum pressure may equal the pressure within reservoir 14 or that available from other pressure source. If this method of applying the brakes is followed, valve member 25 may be moved away from outlet tube 23 for each increment of pressure on conduit 18 and chamber 33a, or a total of several times for a single application of the brakes to slow the vehicle. To permit the valve to operate satisfactorily under this situation, the force of spring 30 and the total area of diaphragm 26 may be in such relation that only a small increment of pressure in the upper chamber is required to cause the spring to yield and open the valve, as for example an increase in pressure of two or three pounds per square inch.

After the brakes have been set, high fluid pressure exists in the pressure accumulation chamber 33b. When the brakes are released this pressure is relieved to allow normal operation of the valve in response to forces resulting from an excess of fluid pressure on the side of valve member 25 adjacent the fluid outlet at 23. This high pressure in chamber 33b can bleed off through pressure equalizing passage 34 into the upper chamber. However, reduction of the pressure in the pressure accumulation chamber by this means may take so long that it interferes with immediate reapplication of the brakes. For this reason I prefer to provide additional valve means for rapidly relieving the fluid pressure in the lower chamber when in excess of the fluid pressure in the upper chamber. One form of such valve means consists of fluid passage 32 in valve member 25 normally closed by flexible disc 31. Disc 31 is held against the upper end of passage 32 by the force of spring 39 on ring 38 and by the excess pressure in the upper or inlet chamber. When air pressure in the lower chamber exceeds that in the upper chamber, it raises disc 31 and ring 38, as shown in Fig. 4, to allow air to pass into the upper chamber and quickly relieve the excess pressure in the lower chamber. For this reason compression spring 39 is purposely made very light to merely exert enough force to keep the edge of flexible disc 31 lying flat against diaphragm 26.

When valve 15 is operated by brake pedal 16 to apply the brakes, a substantial fluid pressure exists within conduit means 18 for as long as the brakes are being applied. Typically, this pressure may be of the general order of fifty to seventy-five or more pounds per square inch. When brake pedal 16 is released, valve 15 is moved to a position in which it releases pressure in the conduit means by allowing air to escape to the atmosphere. However, in order to obtain a substantially instantaneous release of the brakes, rather than a comparatively slow release as occurs if pressure is relieved solely through valve 15, quick-release valves 19 of conventional design are inserted in the conduit means very quickly to reduce pressure within the lines to zero. The presence of safety valves 20 does not interfere with this normal operation of the brake system or its component parts. The quick-release valve may be between a safety valve 20 and a brake cylinder 12, as at the front wheels in Fig. 1, or it may be between the safety valve and control valve 15, as shown at the rear wheels. In the first arrangement, releasing pedal 16 to release the brakes relieves air pressure in chamber 33a directly. In the second arrangement, releasing pedal 16 relieves air pressure in the quick-release valve which then functions normally and in turn releases pressure in chamber 33a. In either case a decrease in air pressure in chamber 33a is followed closely by a corresponding decrease in air pressure in lower chamber 33b as air in the lower or pressure accumulation chamber flows out of it through openings 32 and 34. As the pressure decreases in chamber 33b, the total force holding valve 25 against outlet 23 decreases. Soon a point is reached at which the air pressure in outlet 23 exerts a force sufficient to overcome spring 30 and move valve 25 away from the outlet and pressure in the line 18a is relieved through the safety valve. Consequently valve member 25 moves to open port 23 either in response to an increase in air pressure in chamber 33a acting on the diaphragm as air pressure is applied from source 14, or in response to a subsequent drop in air pressure in chamber 33a because of the force exerted on the diaphragm by air at a high pressure trapped beyond the valve, i. e. between valve 20 and brake cylinder 12. In either case the net resultant force on the valve member is such as to open the valve long enough to generally equalize air pressures, when spring 30 takes over and closes the valve member.

I show at 40 a very restricted passage leading directly from chamber 33a into the outlet tube 23 to by-pass valve 25. This is an optional feature that permits a slow supply of air to the brakes when pressure is applied, in order to compensate for loss of air by a slow leak at or near the brake. This feature permits the brakes when set to be firmly maintained in operation; but it is not necessary to satisfactory operation and does not change the operation described above.

It will be apparent that various changes in the construction details of a safety valve built according to my invention may be made, and I have illustrated in Fig. 5 a modified form of valve showing various changes, some of which can be substituted in whole or in part for features illustrated in the form of Figs. 2 and 3. In this form of the invention, the valve housing is formed with a cylindrical section 21d within which piston 44 can reciprocate. The skirt of the piston engages the inside walls of housing section 21d with a fluid tight fit, the piston thus being another form of movable valve member 25a. Compression spring 30 bears against the end of housing 21d and the underside of piston 44 to yieldingly force the valve member 25a upwardly into engagement with outlet member 23a.

In this form of the invention, outlet member 23a is non-adjustable and is formed as an integral portion of cover 21e which closes the upper end of the cylindrical housing 21d. As before, the movable valve member 25a subdivides the interior of the valve housing into an upper chamber 45a and a lower chamber 45b. Fluid inlet 22a opens into the upper chamber, as does the open end of outlet tube 23a. Suitable provision is made at the inlet and outlet for connection to conduit means 18 and branch conduit 18a.

Fluid passage 34 is omitted in this form of the invention and replaced by external by-pass line 46 which opens at one end into the upper chamber 45a and at the other end to lower chamber 45b. This is an example of another type of pressure equaliziing means. In order to obtain adjustability in the rate of fluid flow through line 46, it may be desired to insert in this line at 47 an adjustable metering orifice, of any suitable type, the size of which can be increased or decreased by turning adjusting screw 47a. In this way, the length of time required to equalize pressures in the upper and lower chambers within the valve can be adjusted quickly and easily. Hence, in this form of the invention the interval of time during which movable valve member 25a uncovers fluid outlet 23a is determined by controlling the minimum size of the pressure equalizing passage rather than by adjustment of the position of the outlet orifice.

In a similar manner the pressure release valve at 32 may be omitted from the movable valve member and replaced by a simple check valve 48 of any conventional construction, for example a ball check valve. Check valve 48 is conveniently located outside the valve housing and in by-pass line 50 which opens at one end into lower chamber 45b and at the other end into conduit 18 and thence into upper chamber 45a; however, the invention is not limited to this particular location of the check valve. In the same manner as described before, check valve 48 functions to permit fluid flow out of pressure accumulation chamber 45b when pressure therein is higher than the pressure in conduit 18.

The operation of the modification of my invention illustrated in Fig. 5 is the same in all respects as described above. With both forms of safety valve, spring 30 provides a positive means for normally closing conduit 18 to fluid flow, except for a short interval of time, the maximum duration of which can be pre-established. Consequently, even though a mechanical failure allowing escape of air occurs in the fluid control system at some point beyond the safety valve, operating fluid cannot reach this point of failure and escape to the atmosphere for a period of time longer than this interval during which the valve outlet is open. Without a valve such as this safety valve, air would escape continuously and drain the system to the point where it could no longer operate the brakes. Since in a compressed air braking system a compressor or the like is provided to replenish the operating fluid in tank 14, even a repeated opening of safety valve 20 does not permit the escape from the control system of a quantity of fluid sufficient to endanger proper operation of the remainder of the system. Consequently, a valve 20 effectively isolates a defective portion of the system from the remainder of the system which is then able to retain operating fluid under normal pressures and therefore to operate in a normal manner.

Throughout the foregoing description various directional terms such as "upper" and "lower" have been used to facilitate description of the valve. These words denoting relative direction have been used with reference to the position of the valve shown in the drawings and are not to be considered as limitative upon the invention since the valve may be mounted on the vehicle in any suitable position, and the relative positions of the parts may then be changed accordingly.

Having described a preferred form of my invention and indicated certain possible modifications thereof, it will be understood that other changes in the construction and arrangement of parts may occur to persons skilled in the art and be made without departing from the spirit and scope of my invention. Consequently, I wish it understood that the foregoing description is considered as being illustrative of, rather than limitative upon, the invention as defined in the appended claims.

I claim:

1. In a safety valve construction for a fluid pressure system, the combination comprising: a housing provided with a fluid inlet and a fluid outlet; a movable valve member dividing the housing interior into first and second chambers with the inlet and outlet opening into the first chamber and forming in the second chamber a pressure accumulating space that is completely isolated except for communication with the first chamber, said valve member being movable into engagement with the outlet to close it; spring means bearing against the valve member normally holding it against the outlet to close the outlet to fluid flow, the spring yielding under fluid pressure against the valve member in the first chamber to open the outlet; fluid passage means extending between the two chambers for restricted fluid flow into the second chamber to equalize fluid pressures in said two chambers, permitting the valve member to resume its normal position under the force of said spring means; and a check valve on the movable valve member comprising a hole through the valve member and a flexible member covering the hole at the side of the first chamber to permit fluid flow through the hole from the second chamber only.

2. In a safety valve construction for a fluid pressure system, the combination comprising: a housing provided with a fluid inlet and a fluid outlet; a flexible diaphragm constrained about its periphery by the housing and dividing the housing interior into first and second chambers with the inlet and outlet opening into the first chamber, said diaphragm being movable into engagement with the outlet to close it; a relatively rigid plate mounted centrally of the diaphragm; spring means bearing against the rigid plate on the diaphragm and normally holding the diaphragm against the outlet to close the outlet to fluid flow, the spring yielding under fluid pressure against the valve member in the first chamber to open the outlet; fluid passage means extending between the two chambers for restricting fluid flow into the second chamber to equalize fluid pressures in said two chambers, permitting the valve member to resume its normal position under the force of said spring means; and a check valve comprising a hole through the diaphragm and a flexible member covering the hole on the side of the first chamber to permit fluid flow from the second chamber only.

3. In a safety valve construction for a fluid pressure system, the combination comprising: a housing provided with a fluid inlet and a fluid outlet; a movable valve member dividing the housing interior into first and second chambers with the inlet and the outlet opening into the first chamber, said valve member being movable into engagement with the outlet to close it; spring means bearing against the valve member normally holding it against the outlet to close the outlet to fluid flow, the spring yielding under fluid pressure against the valve member in the first chamber to open the outlet; fluid passage means extending between the two chambers for restricting fluid flow into the second chamber to equalize fluid pressures in said two chambers, permitting the valve member to resume its normal position under the force of said spring means; and check valve means carried by the valve member, said check valve means comprising a second fluid passage passing through the valve member and extending between the two chambers and a flexible member covering the second fluid passage on the side of the first chamber to permit fluid flow from the second chamber only.

4. A safety valve construction for a fluid pressure system, the combination comprising: a housing provided with a fluid inlet and a fluid outlet; a flexible diaphragm constrained about its periphery by the housing and dividing the housing interior into a first chamber and a second chamber with the inlet and outlet opening into the first chamber, said diaphragm being movable into engagement with the outlet to close it; the diaphragm and housing defining in the second chamber a pressure accumulating space that is completely isolated from said housing outlet; spring means bearing against the diaphragm normally holding it against the outlet to close the outlet to fluid flow, the spring yielding under fluid pressure against the diaphragm in the first chamber to open the outlet; a fluid metering passage extending through the diaphragm and between the two chambers for restricted fluid flow into the second chamber in response to higher pressure therein to equalize fluid pressures in the two chambers thus permitting the valve member to resume its normal position under the force of said spring means, the cross-sectional area of said metering passage being of a size to accomplish pressure equalization within a time interval of approximately one second; a second fluid passage through the diaphragm extending between the two chambers, the second fluid passage having a cross-sectional area several times the cross-sectional area of the fluid metering passage; and check valve means carried on the diaphragm permitting unidirectional flow through the second fluid passage from the second chamber directly into the first chamber when pressure in the second chamber is in excess of the pressure in the first chamber in order to relieve such excess pressure very quickly.

5. In a safety valve construction for a fluid pressure system, the combination comprising: a housing provided with a fluid inlet and a fluid outlet; a movable member dividing the housing interior into a first and a second chamber with the inlet and the outlet opening into the first chamber from the exterior of the housing; the second chamber defining a pressure accumulating space that is isolated from direct communication with said fluid outlet, said movable member including valve means movable into engagement with said outlet to close it; resilient means bearing against the movable member normally holding the valve means in closed position against the outlet to close the outlet to fluid flow, the resilient means yielding under force applied to the movable member by fluid pressure in the first chamber and against the movable member in a direction to open the outlet; fluid passage means extending between the two chambers for restricted fluid flow into the second chamber to equalize fluid pressures in said two chambers at a predetermined restricted rate, said passage means providing the sole means for admitting fluid to the second chamber; and a tube adjustably mounted in the housing for movement toward and away from the valve means, the inner end of the tube extending into the first chamber to provide said outlet and the other end of the tube extending to a position outside the housing.

References Cited in the file of this patent

UNITED STATES PATENTS

| | | |
|---|---|---|
| 772,951 | Morrison | Oct. 25, 1904 |
| 1,294,980 | Turner | Feb. 18, 1919 |
| 1,848,413 | Bragg et al. | Mar. 8, 1932 |
| 1,985,770 | Edwards | Dec. 25, 1934 |
| 2,000,002 | Stockmeyer | Apr. 30, 1935 |
| 2,097,889 | Miller | Nov. 2, 1937 |
| 2,141,688 | Eaton | Dec. 27, 1938 |
| 2,159,788 | Farmer | May 23, 1939 |
| 2,185,103 | Heigis | Dec. 26, 1939 |
| 2,286,713 | Burks | June 16, 1942 |
| 2,328,007 | Griswold | Aug. 31, 1943 |
| 2,394,911 | Griswold | Feb. 12, 1946 |

FOREIGN PATENTS

| | | |
|---|---|---|
| 400,092 | Great Britain | Oct. 19, 1933 |